United States Patent [19]
Schroeder

[11] 3,751,013

[45] Aug. 7, 1973

[54] MIXER ATTACHMENT FOR ICE CREAM FREEZER

[76] Inventor: Clarence J. Schroeder, Box 660, Murphy, N.C. 28906

[22] Filed: May 24, 1972

[21] Appl. No.: 256,398

[52] U.S. Cl. .................................. 259/185, 259/108
[51] Int. Cl. .............................................. B01f 7/16
[58] Field of Search .................... 259/107, 108, 185, 259/186, 121, 122, 66, 67, 8, 23, 24, 43, 44, DIG. 34

[56] References Cited
UNITED STATES PATENTS

| 663,795 | 12/1900 | Stevens | 259/185 |
| 830,256 | 9/1906 | Smith | 259/108 |
| 876,633 | 1/1908 | Gray | 259/122 |
| 1,042,278 | 10/1912 | Roseland | 259/108 |
| 1,435,289 | 11/1922 | Gilbert | 259/108 |

Primary Examiner—Robert W. Jenkins
Attorney—Lamont Johnston

[57] ABSTRACT

An agitator or stirrer adapted for use in a home ice cream freezer to mix bread dough and the like which consists of a curved length of rod having an angular fitting at its upper end to be engaged and driven by the driving socket of the freezer and a finger projecting downwardly into the bearing socket of the freezer tub, the lower end being shaped to extend close to the corner between the side wall and bottom of the tub and the portion between the upper fitting and the finger extending into close proximity with the wall of the tub.

1 Claim, 2 Drawing Figures

MIXER ATTACHMENT FOR ICE CREAM FREEZER

BACKGROUND OF THE INVENTION

At the present time, many people own and use ice cream freezers, whether hand operated or electric. The typical freezer is circular in cross section and many of those being sold at the present time consist of plastic tubs having bearing sockets at the centers of their bottoms for journaling an inner can or bucket which contains the ice cream mixture. The top portion of the freezer has a transversely extending bracket in the center of which is a driving socket for connection with the interior can to revolve it relative to the dasher, which is stationary, within the can for stirring the ice cream mix. Home ice cream freezers are used only a few times per year, ordinarily. At the present time, there is considerable amount of interest in making bread of the health food variety at home. Mixing the dough is a laborious process, when done by hand, but I have discovered a means for lightening the hand labor involved in making one's bread dough at home.

SUMMARY OF THE INVENTION

One object of this invention is to provide an attachment for ice cream freezers which can be used in standard home ice cream freezers as now sold and which lightens considerably the labor of making bread dough and other mixes at home.

Another object is to provide an attachment for a home ice cream freezer which enables the mixing of bread dough and other mixes in a standard ice cream freezer, as now commercially sold, the agitator being readily connected to the mechanism for driving the ice cream freezer can, the agitator being pivoted in the bearing socket provided in the tub of the ice cream freezer and being effective in mixing thoroughly bread dough and other mixes.

DESCRIPTION OF THE PREFERRED EMBODIMENT

Figure 1:
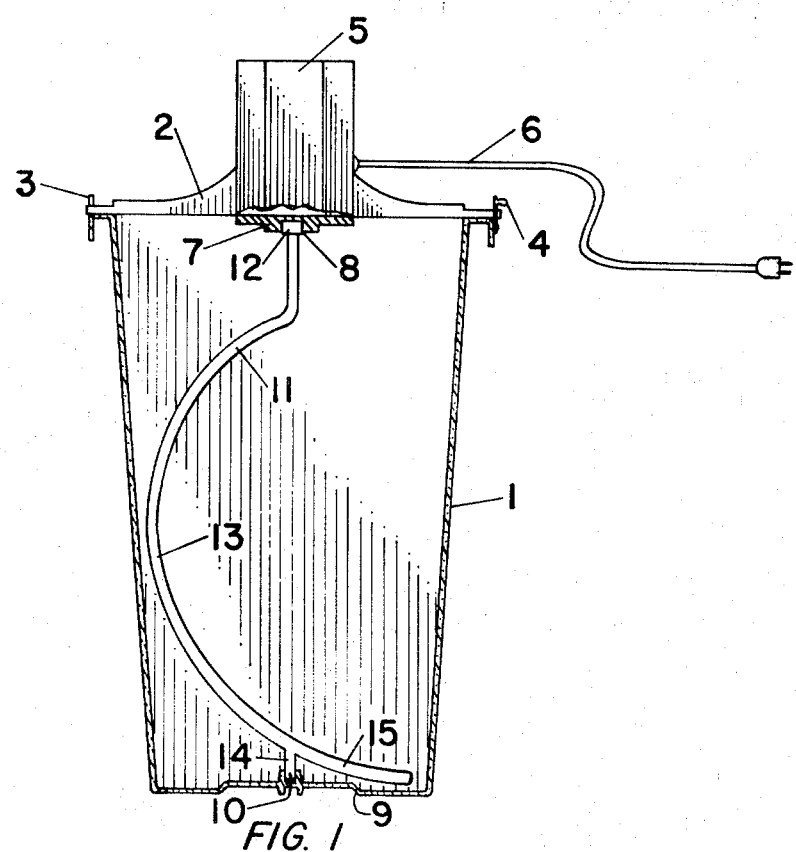
FIG. 1 is a cross sectional view of an ice cream freezer showing one embodiment of a mixer attachment in position in the freezer and ready for use as a mixer.
Figure 2:
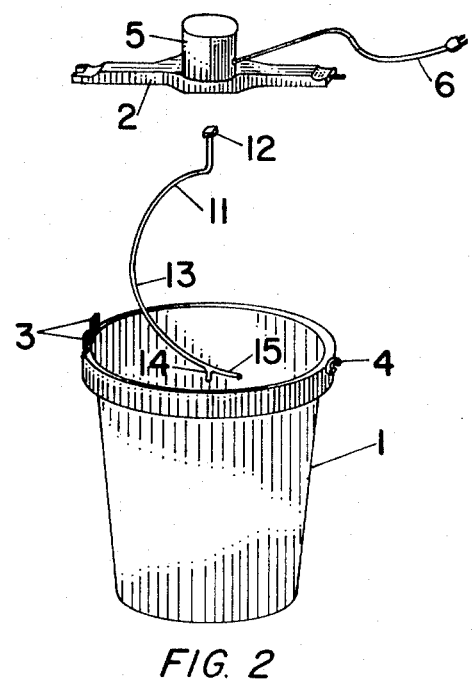
FIG. 2 is an exploded view.

There is shown in the drawing an ice cream freezer which is currently a standard article of commerce, the freezer having a tub 1, usually plastic in the electrically operated models, to the top of which is attached a transverse member 2 hooked to one side 3 of the top of the tub and fastened by a catch 4 to the other side of the tub. Although a hand-operated driving mechanism may be employed, it is now common for an electric motor 5 connected by suitable wiring 6 to an electrical outlet to do the work of operating the freezer. To the lower end of the electric motor there is connected a driving socket 7 having an opening 8 in which are positioned driving notches for engagement with the inner can, not shown, of an ice cream freezer.

In the center of the bottom 9 of the ice cream freezer tub 1 there is conventionally formed a bearing socket 10 for supporting rotatively the inner container or can of an ice cream freezer.

In the present adaptation of a home ice cream freezer to a mixing operation, a mixer attachment or stirrer 11, in the cross-sectional form of a rod, is provided which has, at its top end, a fitting or nut 12 of square or other suitable angular cross section so as to be engaged and driven by the driving socket 7 of the freezer. The attachment extends downwardly from the fitting 12 and is so shaped, e.g., by being curved outwardly, as to form a portion 13 which comes nearly in contact with the side wall 1 of the freezer tub. The shape of the portion 13 is to be varied according to the density, viscosity, consistency and other qualities of the material to be mixed.

Below the portion 13 where the attachment extends closely adjacent to the side wall 1, the stirrer attachment curves back inwardly to a part where it has a finger 14 projecting downwardly and adapted to be journaled in the bearing socket 10, which functions as a support in which the finger 14 rotates. From the finger 14, the attachment extends further out to an end 15 very close to the corner junction between the side wall 1 and the bottom wall 9 of the freezer tub.

It has been found experimentally that there is a limit to the amount of curvature, or other shape, which can be used in the portion 13 before the attachment builds up too much resistance to the bread dough mix, or other mix, as it thickens with the addition of sufficient material to make the proper mix.

An attachment made in accordance with this invention can be made in various dimensions and diameters of the rod to be suitable for use with various sizes, depths, etc., of ice cream tubs presently being used and with materials of various kinds to be mixed.

In use of the invention, the agitator or mixer attachment is held firmly and rotates while the ice cream freezer outer tub, itself, remains stationary.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. An agitator particularly adapted for stirring a semi-viscous pasty material such as bread dough mix and for use in a home ice cream freezer having a rotating driving socket for a can and a tub for refrigerant with a bearing socket at the center of its bottom, the agitator having an angular fitting at its upper end for engagement by the driving socket, a cylindrical finger projecting vertically downwardly near its lower end for journaling in the bearing socket of the tub, the lower portion of the agitator extending from the finger to an end in close proximity with the corner between the bottom and side of the tub and the agitator being so shaped that the portion between the fitting at its upper end and the finger near its lower end extends closely adjacent to the side of the tub.

* * * * *